United States Patent

Svensson

[15] 3,680,808
[45] Aug. 1, 1972

[54] INERTIA REEL SAFETY HARNESS FOR USE IN VEHICLES

[72] Inventor: Gustav Einar Wilhelm Svensson, Villa Solhall, Box 61 S-310 33, Holm, Sweden

[22] Filed: Sept. 22, 1970

[21] Appl. No.: 74,373

[30] Foreign Application Priority Data

Oct. 1, 1969 Sweden...................13493/69

[52] U.S. Cl. ............................................242/107.4
[51] Int. Cl. ............................................A62b 35/00
[58] Field of Search..........242/107 R, 107 SB, 107.4, 107.5, 242/107.6; 297/388; 280/150 SB

[56] References Cited

UNITED STATES PATENTS

| | | | |
|---|---|---|---|
| 3,343,763 | 9/1967 | Spouge | 242/107.4 |
| 3,510,085 | 5/1970 | Stoffel | 242/107.4 |
| 3,521,832 | 7/1970 | Rex | 242/107.4 |

Primary Examiner—Werner H. Schroeder
Attorney—Kane, Dalsimer, Kane, Sullivan and Kurucz

[57] ABSTRACT

An improved inertia reel safety harness for use in vehicles, the safety harness being of the kind having a reel-up mechanism with a spindle and a cylindrical head rotating therewith. The head is provided at its one end portion with a ratchet wheel, and a spring counteracting unwinding of the harness. A runner ring is provided in a groove extending peripherally of the head, the diameter of said runner ring exceeding that of the head, whereby a gap is formed beneath the same when the runner ring is in position of rest (neutral position). When a sudden pulling force is exerted on the harness, the runner ring works as a pendulum influencing a spring means which displaces a catch means, which preferably is shaped as a wedge, into engagement with the teeth of the ratchet wheel, thus locking the harness against further unwinding. On the other hand, when the harness is being paid out slowly, the runner ring remains in its neutral position, such that the harness is only influenced by the spring counteracting unwinding but not locked as a result of the displacement of the runner ring.

7 Claims, 6 Drawing Figures

PATENTED AUG 1 1972
3,680,808
SHEET 1 OF 2
Fig.5
Fig.1
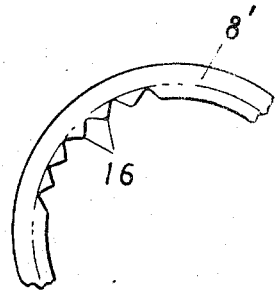
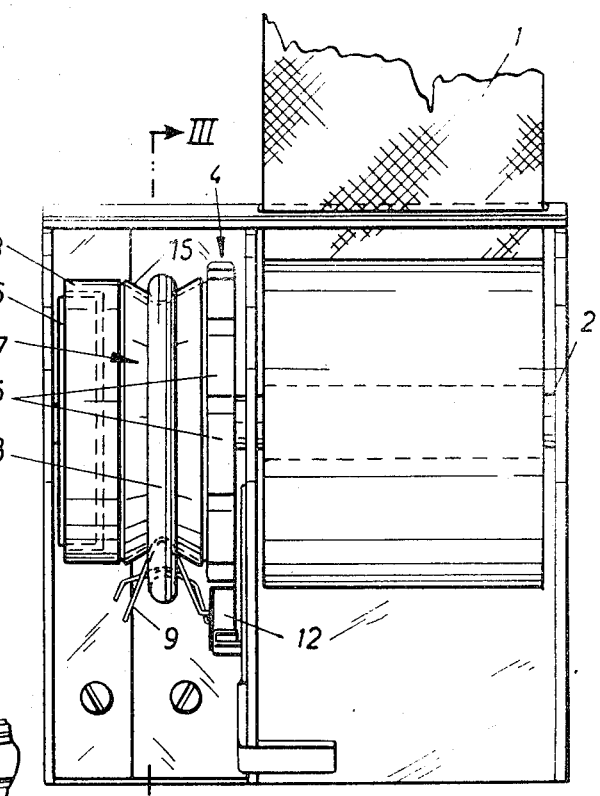
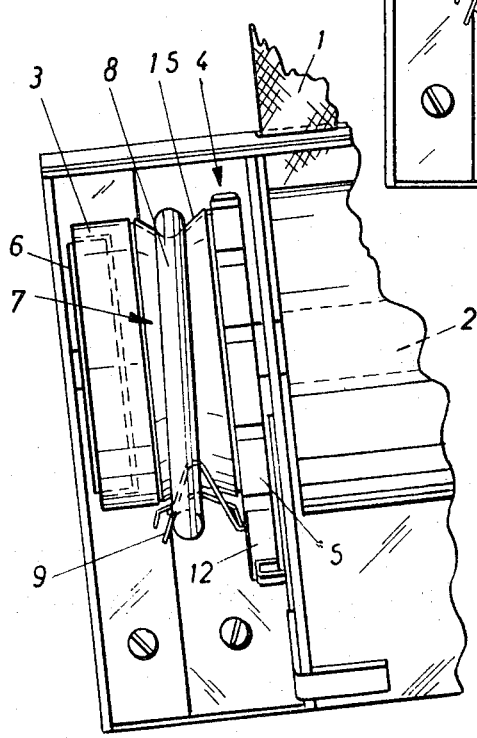
Fig.2
INVENTOR
GUSTAV EINAR WILHELM SVENSSON
BY

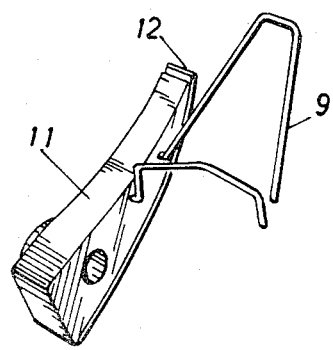
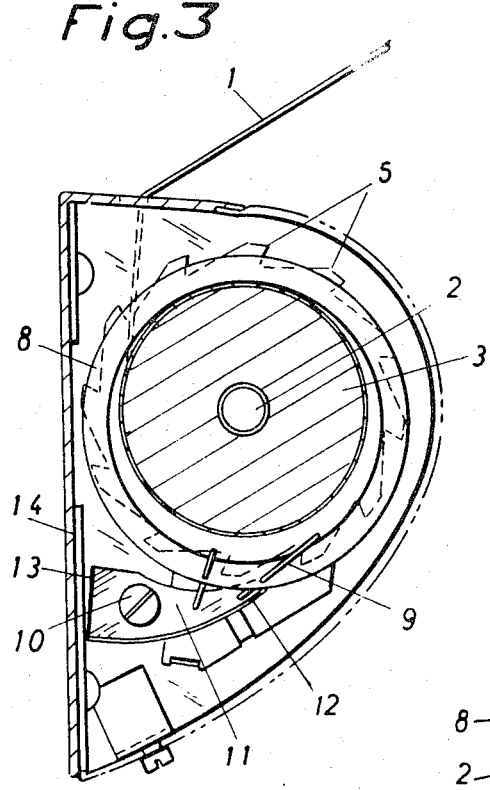
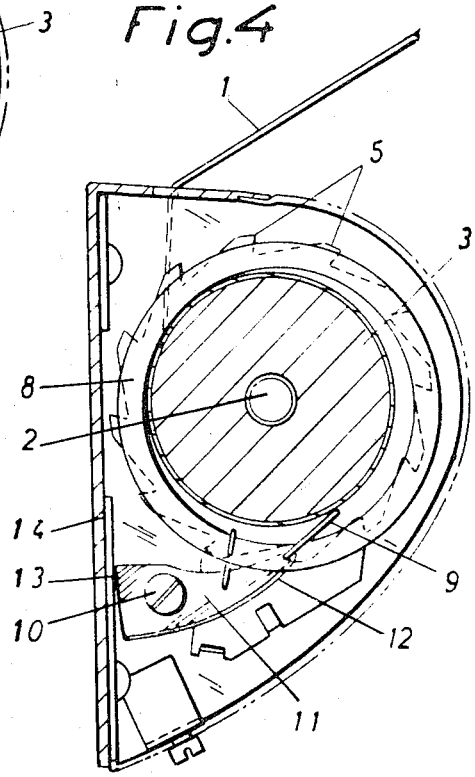

INERTIA REEL SAFETY HARNESS FOR USE IN VEHICLES

BACKGROUND OF THE INVENTION

The present invention relates to a mechanism in inertia reel safety harnesses intended for use in vehicles. More specifically, the invention relates to a device which is provided with a reel-up mechanism comprising a preferably cylindrical head which is adapted to rotate together with the reel-up spindle of the harness, the said head presenting at its one end portion a ratchet wheel, and a spring acting against unwinding. The reel-up mechanism is arranged in such a way that only a certain spring load counteracts slow unwinding of the harness. When on the other hand the harness is winding out rapidly, or comparatively rapidly, the reel-up mechanism is brought to its locked position and further unwinding of the harness thus prevented.

Several devices of the above-indicated type are already known, and they work on various principles. On the one hand rapid paying-out of the harness may be done at will, on others this occurs through the vehicle suddenly braking whereby the person wearing the harness is flung forwards in the vehicle. To establish locking action in the first case some known constructions work in accordance with the centrifugal principle whereby balls or similar elements in the reel-up mechanism are rapidly unseated upon quick unwinding of the harness, thereby bringing friction discs or locking teeth into contact with each other, which elements in turn press the reel-up mechanism to its locking position.

To establish a locking action in the second case, i.e. if a vehicle changes its speed or direction unexpectedly quickly, some known constructions make use of a pendulum acting as an inertia means, the said pendulum, upon its movement outwards from neutral position, possibly trough an operating means, urging a blocking means to lock the reel-up mechanism and thus prevent subsequent unwinding of the harness.

When these two principles are combined in one and the same construction, a very complicated device results which in turn involves high manufacturing costs and extensive servicing to achieve satisfactory safety.

SUMMARY OF THE INVENTION

The purpose of the present invention is to create a device which through extremely simple means urges the reel-up mechanism to locking position in all situations outlined above. The invention is characterized by a runner ring which is inserted in a peripherally extending groove in the head, the inner diameter of said runner ring somewhat exceeding the diameter of the head — at least within the groove — such that a gap is formed between the head and the runner ring vertically below the head in the position of rest or neutral position of the runner ring, the said runner ring being arranged, when swung outwards from said neutral position through rapid unwinding of the harness and/or as a consequence of a sudden change of the vehicle speed or direction by means of an operating means disposed between the head and the runner ring to urge a catch means to engage any one of the teeth of the ratchet wheel. In practice, this runner ring has proved to work with absolute reliability both as a pendulum when changes in vehicle speed or direction suddenly occur, and as an inertia means when the harness is purposely paid out quickly.

Further advantages and characteristics of the invention will be apparent from the following detailed description.

BRIEF DESCRIPTION OF THE DRAWINGS

FIG. 1 is a front view of the device;
FIG. 2 is a front view of a part of the device, showing it in an oblique position;
FIG. 3 is a section along line III—III of FIG. 1;
FIG. 4 is a section similar to the one in FIG. 3 but showing the runner ring in a position in which it is swung forward; and
FIGS. 5 and 6 show details of the device.

DETAILED DESCRIPTION OF A PREFERRED EMBODIMENT

The safety harness 1 is arranged in such a way that it may be reeled up on a rotatably mounted spindle 2. Together therewith rotates a preferably cylindrical head 3 which is provided at its inner end portion with a ratchet wheel 4 having locking teeth 5 provided thereon. In the end portion of the head 3 opposite the ratchet wheel 4, a spring, preferably a clock spring 6, is provided, the said spring 6 counteracting unwinding of the harness. The central portion of the head has a peripherally extending groove 7 in which is inserted a runner ring 8, the inner diameter of which somewhat exceeds the diameter of the head 3 in the groove 7. As a result, a gap is formed between the head 3 and the runner ring 8, this gap being at its widest vertically beneath the head in the position of rest or neutral position of the runner ring. In the said gap is located an operating means 9, which consists of one front and one rear bent wire and is attached to a catch means 11 (see FIG. 6) which is pivotably mounted about its fulcrum 10.

The catch means 11 consists of a pawl having its apex bent towards the ratchet teeth 5. A spring leaf 12 extends along the outwardly facing edge portion of the pawl 11 and at the pawl apex it leaves a small space between itself and the edge portion of the pawl. When the catch means 11 is being swung inwards to its locking ratchet engaging position, one locking tooth 5 will abut against the spring leaf 12, urging it inwards in contact with the pawl apex. This creates a softer impact. At the same time the straight edge 13 of the pawl 11 opposite the apex will move into contact with the back 14 of the device such that the force of impact need not be entirely taken at the fulcrum 10.

The device operates in the following manner. The runner ring 8 serves on the one hand as a pendulum, which is illustrated in FIG. 2. If for instance the vehicle runs off the road and lands itself in an oblique position, the runner ring will, through a pendulum swing, move into contact with the operating means 9 which thus urges the catch means 11 to swing into engagement with the ratchet wheel 4, thus preventing unwinding of the harness 1. This pendulum movement with resultant blocking of the harness 1 may, of course, be effected with the same degree of efficiency in a direction forwards-backwards as in the lateral direction, which is relevant for rapid speed changes of the vehicle.

On the other hand the runner ring 8 has the purpose of preventing the harness 1 from being rapidly reeled out which is illustrated in FIG. 4. As long as the harness 1 is being pulled out slowly the runner ring 8 will, through its turning movement, constantly be in the position shown in FIG. 3, i.e. its neutral position. However, as soon as the harness is being reeled out through a sudden and strong pulling force acting thereon (clock-wise rotation as seen in FIGS. 3 and 4), owing to inertia, the runner ring will not have time enough to catch up with the change in rotational speed and the result thereof is that the widest gap between the runner ring and the groove 7 which previously was to be found vertically beneath head 3 now moves upwards against the direction of rotation. Just as in the case of the above-mentioned pendulum swing the result is that the operating means 9 brings the catch means 11 to its locking position.

To ensure a quick reaction of the pendulum swing the surface of the grooves 7 is preferably provided with a friction coating 15. To further enhance a rapid effect when a sudden pulling force acts on the harness 1, the runner ring 8 may have an oblique and/or non-round configuration, such configuration being not, however, illustrated on the drawings. Alternatively, it is possible to use a runner ring 8' which, as shown in FIG. 5, is formed with internal teeth 16 adapted to engage corresponding teeth formed in the head. The risk that the runner ring 8' will slide on the head 3 thus is completely eliminated. If a pull on the harness 1 is heavy enough to make the runner ring 8' miss one or a few teeth, this has the positive effect of lifting the runner ring and thus taking the catch means 11 to its locking position.

The invention is not limited to the embodiments as illustrated and described but many variations are possible within the scope of the appended claims. Instead of forming an indentation in the head 3, as illustrated on the drawings, the groove 7 may be formed from a couple of peripherally extending and mutually parallel beads between which the ring 8 is supported. Naturally, the operating means 9 as well as the catch means 11 may be shaped in ways different from the one illustrated.

What I claim is:

1. An improved inertia reel vehicle safety harness mechanism including in combination frame means, a spindle rotatably mounted on said frame means, a cylindrical head rigidly attached to said spindle and rotatable therewith, ratchet means mounted on said head and disposed concentrically of said spindle, catch means pivotally mounted on said frame, a first position of said catch means engaging said ratchet means, a second position of said catch means disengaged from said ratchet means, a circumferential groove formed in said head, a ring loosely disposed within said groove, said ring resting at its uppermost portion on said head in said groove and with its lowermost portion moveable as a pendulum between second and first positions toward and away from said catch means in response to changes in speed of movement of said head, and an operating means operatively associated with said ring and said catch means whereby the lowermost portion of said ring upon moving away from said catch means contacts said operating means to urge said catch means into said first position to engage said ratchet means so as to lock said head against relative rotational movement of said head and said frame.

2. An improved mechanism in accordance with claim 1, wherein a friction surfacing covers the surface of said groove.

3. An improved mechanism in accordance with claim 1, wherein said ring is oblique.

4. An improved mechanism in accordance with claim 1, wherein said ring is non-round.

5. An improved mechanism in accordance with claim 1, in which said ring has internal teeth arranged therein, corresponding teeth being formed in said head for engagement with the ring teeth.

6. An improved mechanism in accordance with claim 1, wherein said catch means is in the shape of a wedge, the apex of which inclines towards said ratchet means and a leaf spring extends along an outwardly facing edge portion of the wedge forming at the wedge apex a small gap with the edge portion.

7. An improved mechanism in accordance with claim 6, wherein the straight edge of the wedge opposite the wedge apex is arranged for engagement when the wedge apex is swung into engagement with the ratchet wheel.

* * * * *